US008433108B2

(12) United States Patent
Bateman (10) Patent No.: US 8,433,108 B2
(45) Date of Patent: Apr. 30, 2013

(54) VIDEO FINGERPRINTING (75) Inventor: Martin Bateman, St Andrews (GB)

(73) Assignee: The University Court of The University of St Andrews, St Andrews, Fife (GB)

( * ) Notice: Subject to any disclaimer, the term of this patent is extended or adjusted under 35 U.S.C. 154(b) by 1006 days.

(21) Appl. No.: 12/516,918

(22) PCT Filed: Nov. 19, 2007

(86) PCT No.: PCT/GB2007/004386
§ 371 (c)(1),
(2), (4) Date: May 29, 2009

(87) PCT Pub. No.: WO2008/065340
PCT Pub. Date: Jun. 5, 2008

(65) Prior Publication Data
US 2010/0054537 A1    Mar. 4, 2010

(30) Foreign Application Priority Data

Nov. 30, 2006   (GB) .................................. 0623961.0

(51) Int. Cl.
G06K 9/0002    (2006.01)
(52) U.S. Cl.
USPC ............................ 382/124; 382/125; 382/236
(58) Field of Classification Search .................. 382/100, 382/103, 128, 133, 276, 283, 236, 124, 125; 345/629; 250/458.1, 461.1; 600/123, 317; 340/5.53, 5.83; 707/769
See application file for complete search history.

(56) References Cited

U.S. PATENT DOCUMENTS

| 7,043,473 | B1 * | 5/2006 | Rassool et al. ......................... 1/1 |
| 7,702,127 | B2 * | 4/2010 | Mihcak et al. ................. 382/100 |
| 7,912,244 | B2 * | 3/2011 | Mihcak et al. ................. 382/100 |
| 8,131,026 | B2 * | 3/2012 | Benkley et al. ................. 382/124 |
| 8,175,413 | B1 * | 5/2012 | Ioffe et al. ....................... 382/283 |
| 8,195,689 | B2 * | 6/2012 | Ramanathan et al. ......... 707/769 |
| 2006/0103732 | A1 | 5/2006 | Bateman |

FOREIGN PATENT DOCUMENTS

| WO | WO97/40454 | | 10/1997 |
| WO | WO02/51063 | A1 | 6/2002 |
| WO | WO2006/059053 | A1 | 6/2006 |

OTHER PUBLICATIONS

International Search Report for PCT/GB2007/004386, dated Feb. 22, 2008.

* cited by examiner

Primary Examiner — Anh Hong Do
(74) Attorney, Agent, or Firm — W. Kevin Ransom; Moore & Van Allen, PLLC (57) ABSTRACT A method for fingerprinting video comprising identifying motion in a video as a function of time; using the identified motion to create a motion fingerprint; identifying peaks and/or troughs in the motion fingerprint, and using these to create a reduced size points of interest motion fingerprint. Reduced size fingerprints for a plurality of known videos can be prepared and stored for later comparison with reduced size fingerprints for unknown videos, thereby providing a mechanism for identifying the unknown videos.

33 Claims, 8 Drawing Sheets

VIDEO FINGERPRINTING

FIELD OF THE INVENTION

The present invention relates to a system and method for fingerprinting a video and subsequently using that fingerprint to identify copies of original video files.

BACKGROUND OF THE INVENTION

WO2006/059053, the contents of which are incorporated herein by reference, describes a method for fingerprinting video that involves identifying motion within the video and using a measure of the identified motion as a fingerprint for later identification of the video or a copy of that video.

By comparing each frame of a video against the previous frame, motion fingerprints can be created. Differences between the two frames are flagged as motion. A measure of the motion of each frame relative to the preceding frame is calculated by summing the differences in colour between the frames to give a single motion figure that is indicative of the relative motion between them. After the entire video has been processed a mean value is calculated. To save space and speed up matching, motion measurements below the mean are removed, so that only peaks above the mean are extracted. Then, the remaining information is used as the video motion fingerprint.

In practice, a plurality of video fingerprints is stored in a suitable database for use if and when video content is detected. In the event that such content is detected, it is captured and a motion fingerprint automatically created. This is then compared with the fingerprints in the database to identify whether there is a match between the fingerprint of the captured video and any of the stored fingerprints. In the event that there is a match, this is indicative that the intercepted video is a copy of the original and may be a copyright infringement. If this is the case, remedial action can be taken against both the source and the intended recipient of the infringing copy.

The present invention relates to an improved technique for fingerprinting video and identifying unknown video using stored fingerprints.

SUMMARY OF THE INVENTION

According to one aspect of the present invention there is provided a method comprising identifying motion in a video as a function of time and using the identified motion to create a motion fingerprint; identifying distinguishing features or points of interest in the motion fingerprint, and using the distinguishing features or points of interest to create a points of interest fingerprint. By selecting a sub-set of the data in the motion fingerprint, a reduced size motion fingerprint is provided.

The distinguishing features or points of interest may be peaks and/or troughs in the motion data.

Identifying motion within the video may involve comparing a measure of luminance of pixels of a first frame of the video with a corresponding measure of luminance of pixels of a second frame of the video; identifying differences between the luminance for like pixels of the two frames and using this to determine a measure of motion between the two frames, and repeating this for a plurality of frame pairs.

Identifying motion within the video may comprise comparing a measure of luminance of blocks of pixels of a first frame of the video with a corresponding measure of luminance of corresponding blocks of pixels of a second frame of the video; identifying differences between the luminance for like blocks of the two frames and using this to determine a measure of motion between the two frames, and repeating this for a plurality of frame pairs.

According to another aspect of the invention, there is provided a computer program preferably on a computer readable medium, the program having code or instructions for identifying motion in a video as a function of time and using the identified motion to create a motion fingerprint; identifying distinguishing features or points of interest in the motion fingerprint, and using the distinguishing features or points of interest to create a points of interest fingerprint.

According to yet another aspect of the invention, there is provided a computer based or implemented system adapted to identify motion in a video as a function of time; use the identified motion to create a motion fingerprint; identify distinguishing features or points of interest in the motion fingerprint, and use the distinguishing features or points of interest to create a points of interest fingerprint.

According to still another aspect of the invention, there is provided a method for identifying video comprising using a points-of-interest motion fingerprint for an unknown video and a points-of-interest motion fingerprint for at least one known video, thereby to identify a potential match between the unknown video and the known video.

By using the reduced size points-of-interest data, videos that do not match can be readily dismissed, without having to spend time processing a large amount of data. This can speed up the matching and identification process. This process results in a significant reduction in the time taken to identify a video. Without reducing the size of the fingerprint, it can take around twenty seconds to perform the matching process (including lining) on a single fingerprint of a movie. Focusing on points of interest rather than using all data of the fingerprint reduces this time in the best cases to sub ten milliseconds and in the worse cases to around two seconds for when identifying a feature film.

A sub-set of peaks within the points-of-interest fingerprint for the known video and a sub-set of peaks within the points-of-interest fingerprint for the unknown video may be identified and used in the identification process. Relatively high, relatively low or a mixture of high and low peaks may be selected.

The sub-set of peaks may be selected by identifying a highest peak within a pre-determined or selected time slot. This may be done for a plurality of time slots. The timeslots may be of equal length. Another method involves selecting the peaks based on height. For example the highest one hundred peaks or the peaks over a certain height could be selected.

Peak pairs in the sub-set for the known video and peak pairs in the sub-set for the unknown video may be compared, for example by comparing a peak pair distance, i.e. the time between two peaks. The peak pair may comprise adjacent peaks. Alternatively, the peak pair may comprise non-adjacent peaks.

According to yet a further aspect of the invention, there is provided a computer program preferably on a data carrier or computer readable medium, the program having code or instructions for identifying video by using a points-of-interest motion fingerprint for an unknown video and a points-of-interest motion fingerprint for at least one known video, thereby to identify a potential match between the unknown video and the known video.

BRIEF DESCRIPTION OF THE DRAWINGS

Various aspects of the invention will now be described by way of example only and with reference to the accompanying drawings, of which.

DETAILED DESCRIPTION OF THE DRAWINGS

The present invention is based on a technique for fingerprinting video using motion within the video, as described in WO2006/059053, and subsequently using the fingerprint to identify video. In a first step, the video that is to be fingerprinted is decoded frame by frame. In the case of YUV encoded video only the luminance channel is used. All other colour spaces are converted to YUV, so that a minimum amount of information has to be processed and variations due to colour are removed. Preferably, the detection process operates on video with the same aspect ratio as VCD (11:9), although this is not essential. In the case where a video is not in the desired aspect ratio typically only the central part of the frame is used.

Each frame of the video is split into separate blocks, for example for 3990 blocks, 70 wide and 57 high. This comes from a target frame size of 352 by 288 pixels with a block size of 5×5 pixels. A block size of 5×5 at 352 by 288 pixels was chosen, because this provides a large enough area to smooth out noise from the image while still being quite small, so that subtle motions can be determined. Increasing the block size decreases the sensitivity of the system, so it is less able to detect motion but also smoothes out noise introduced due to transcoding. A balance has to be made between the ability of the system to detect motion whilst smoothing out noise.

The mean luminance for each block within the frame is calculated and compared against the mean luminance of the corresponding block in the previous frame. A difference of more than a predetermined threshold, for example ten, is used to indicate that there was motion within the block. A count of all blocks with motion within the frame is kept and used to calculate the percentage of the frame that has changed since the previous frame. This allows a spatial resolution independent method of assessing the amount of motion within a frame. A scaling factor is applied so that the frame difference appears as if the video was playing at pre-determined frame rate, for example 30 per second. This reduces the variation introduced by frame rate differences.

Figure 1:
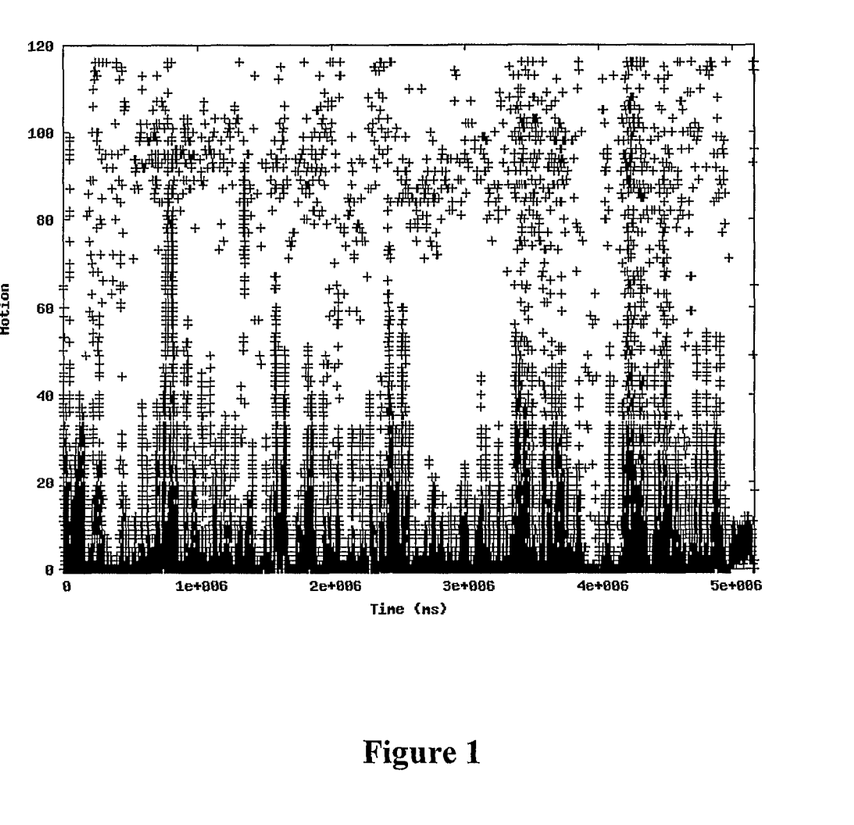
FIG. 1 is sample fingerprint for a segment of video.
Figure 2:
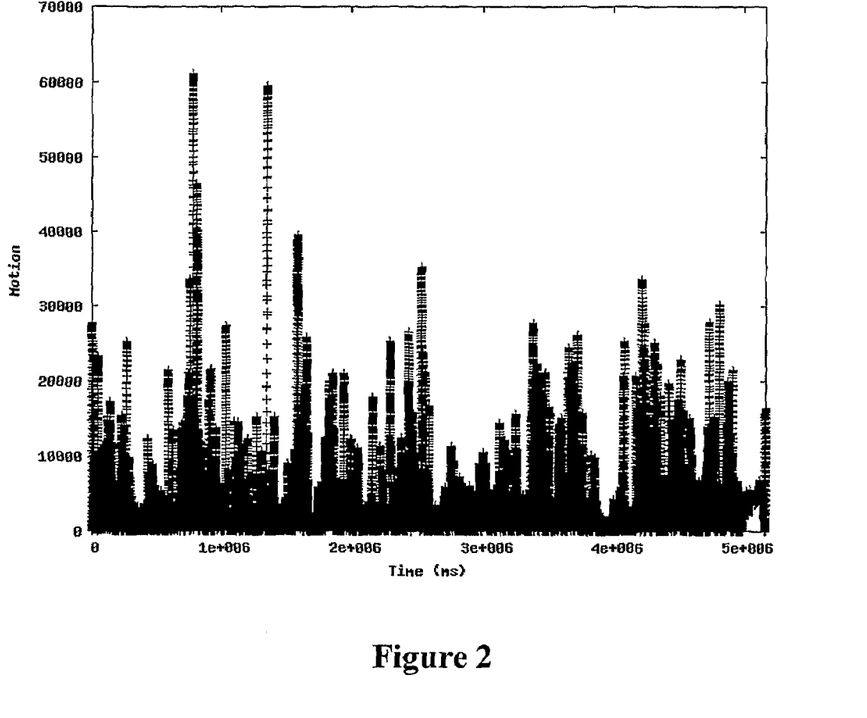
FIG. 2 is a smoothed version of the fingerprint of FIG. 1.
Figure 3:
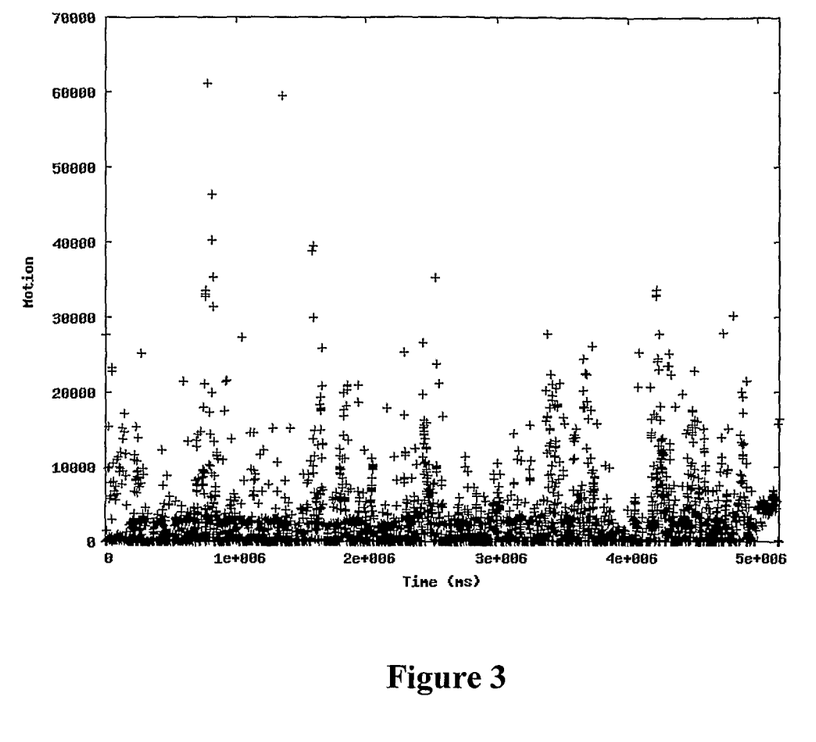
FIG. 3 is points of interest fingerprint for the fingerprint of FIG. 2.

FIG. 1 shows an example of a video motion fingerprint for a 42 minutes segment of video. Because of the scaling process, the motion measurements may be over 100 percent for a single frame. The measurements of FIG. 1 were smoothed using a moving sum function with a simulated frame-rate of 30 Hz over a time period of one second, although any other suitable smoothing function could be used. Smoothing is applied to reduce the number of local maximums. FIG. 2 shows the smoothed data. After this, points of interest such as peaks and/or troughs are extracted and saved, as shown in FIG. 3.

The distance between peaks and/or troughs, as well as the magnitude of these is important in the identification process, but having all the information concerning the measurements between them is unnecessary. This reduces the storage requirements, as most of the data in the smoothed fingerprint is for points along a curve, whereas the points-of-interest data gives only the start and end point of the curve. Although some data is lost, the most significant data is retained, and the reduced file size reduces processing requirements during identification. This is saved for use later in identifying the video, along with metadata about the video. The metadata could be any one or more of the title of the piece of video; the copyright holder; the year the video was produced; the date and time that the video was fingerprinted; the spatial resolution of the video, and the temporal resolution of the video.

By selecting the points-of-interest, the amount of data to be saved and processed is reduced. For example, a typical 43 minutes television program requiring 485 kilobytes of storage for the smoothed fingerprint can be reduced to a points-of-interest fingerprint requiring only 24 kilobytes of storage.

Figure 4:
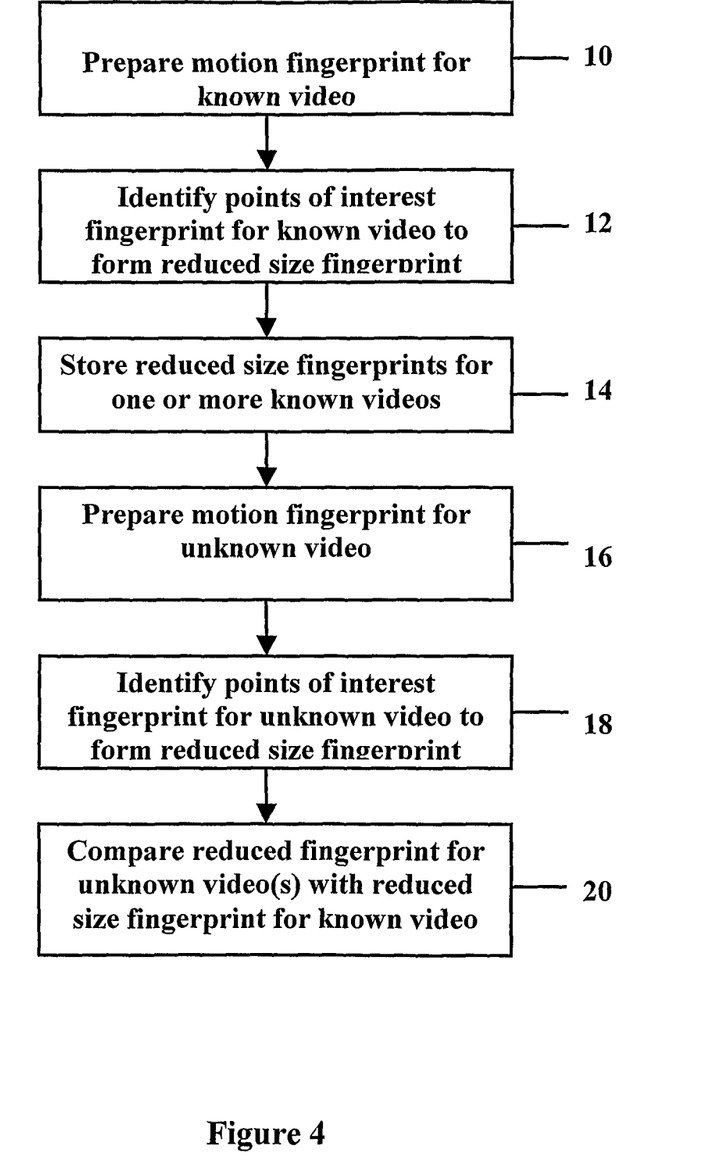
FIG. 4 is a flow diagram of a process for identifying a video using the reduced size fingerprint of FIG. 3.

The stored points-of-interest fingerprint for the known video can be used to identify unknown videos. FIG. 4 sets out the steps for doing this. Firstly motion fingerprints for the known videos are prepared 10 as described above and then points of interest identified, typically peaks and troughs, to reduce the size of the fingerprint 12. The filtered fingerprints are then stored 14, together with a suitable identifier. Typically a library of fingerprints for known videos is stored. When an unknown video file is to be identified it is firstly processed, as described above to give a motion fingerprint 16. This is then processed using the same process as used for the known video to produce a points-of-interest fingerprint 18. Then the fingerprint is compared with the one or more stored points-of-interest fingerprints for the known videos to identify any match 20.

Figure 5:
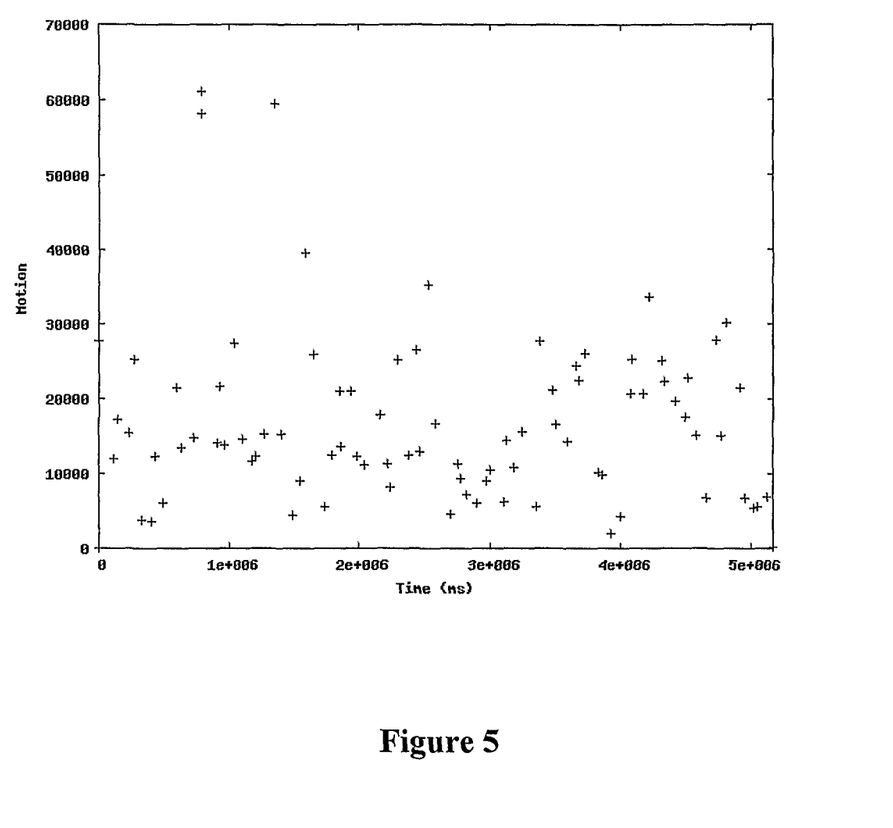
FIG. 5 is a sub-set of the peaks of the points of interest fingerprint of FIG. 3.

To identify possible matches between known and unknown videos, the points of interest fingerprints are typically reduced in size again by, for example, extracting a number of high peaks from the points of interest for the two fingerprints that are being compared. This can be done by checking the points-of-interest motion fingerprint and selecting the highest peak over a given time period for each fingerprint. This process is carried out for the entire length of the video. As an example, if the desired time period was one minute and the video is 45 minutes long then 45 high peaks would be extracted. This gives a reduced size fingerprint, based only on selected points of interest, as shown in FIG. 5.

The number of points of interest to be extracted can be tuned based on a number of factors: (1) the amount of processing time to be used—a larger number of points of interest can give a better match but this takes significantly more processing time, and (2) the length of the video. For a short video, which is 30 seconds long using a time period of 1 minute would be infeasible, instead using a period of 5 or 10 seconds gives better results. In fact, during testing it was found that having at least 40 points of interest gives a good match. Increasing the number of points of interest increases the accuracy but there comes a point when there may be too many. An extreme example of this is when each peak detected is used in the identification process. This could slow down the system due to the amount of data to be processed and lead to false positives.

Next the high peaks between the two fingerprints are matched up. Two peaks in the same fingerprint are defined as a peak pair, with a peak pair distance being the time between two peaks. A peak pair does not have to involve two adjacent peaks. Each peak pair distance from the first fingerprint is matched against all the peak pairs from the second fingerprint. When a match to within a specified tolerance is made the match is recorded for the peak pair in question. The tolerance to be used can be altered depending on the length of the video. There may be several peak pairs from the second fingerprint that match a given peak pair from the first fingerprint. Then the best line up of matching peak pairs identified. By this, it is meant the line up that has the largest number of sequential matching peak pairs.

By generating all possible peak pair combinations and testing the distance of all the sequential peak pair matches, the best line up can be identified. So the distance between a peak and the following peak is measured in the fingerprint to be identified. All possible distances between all peaks are calculated for the reference fingerprint. The distance from the fingerprint to be identified is compared against the sequence of distances from the reference fingerprint. All peak pair distances from the fingerprint to be identified are tested in this manner. This is repeated for all of the stored reference fingerprints. The best match is identified as the reference fingerprint that has the largest number of adjacent matches in the distances between peak pairs.

By using the reduced size points-of-interest data, videos that do not match can be readily filtered out and so removed from the sample set of videos that the unknown video is being compared to, without having to spend time processing a large amount of data. This speeds up the matching and identification process resulting in a significant reduction in the time taken to identify a video. When the unknown video has to be compared with a potentially large number of known videos being able to quickly filter out obvious non-matches is a significant advantage.

Once the best match between the unknown video and one of the stored videos has been found then the best matching segments from the fingerprints for each of these are used to generate two new fingerprints. These new fingerprints can then be compared, for example as described in WO2006059053. This allows a similarity measure for the two videos to be provided. By reducing the data in the fingerprints that have to be compared, videos that do not match can be readily dismissed, without having to spend time processing a large amount of data. This can significantly speed up the matching and identification process.

Figure 6:
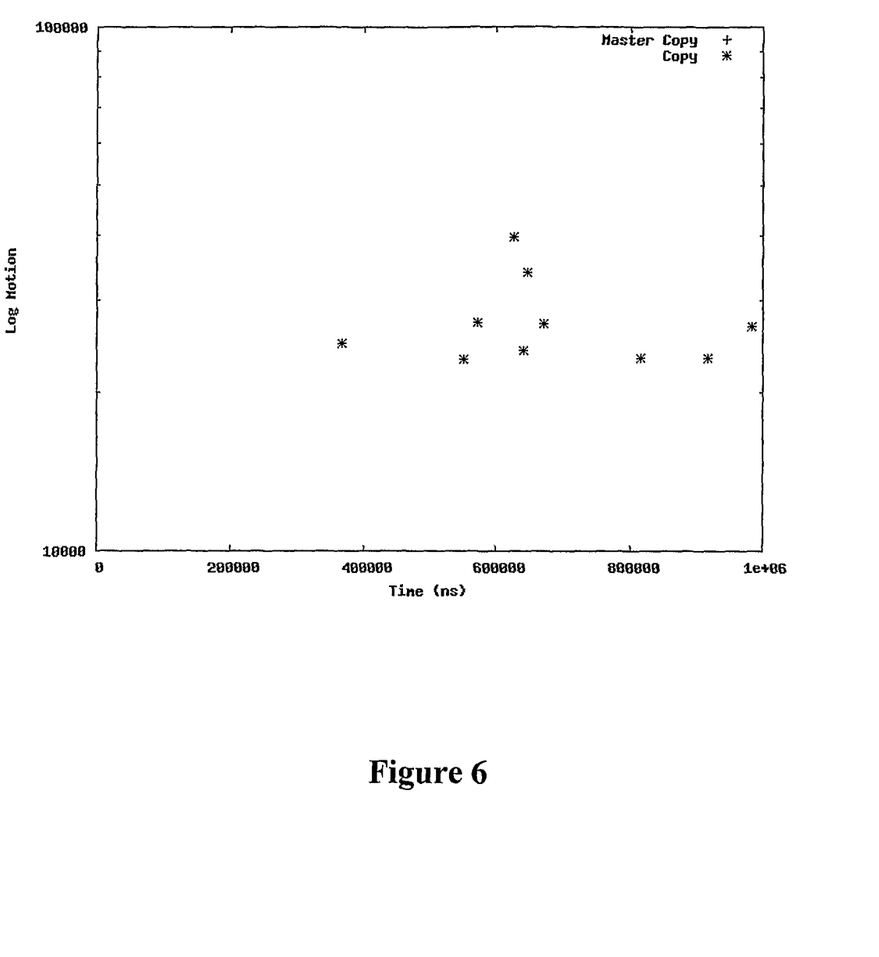
FIG. 6 is a sub-set of the peaks of the points of interest fingerprints for a master version of a video and a good quality copy of that same video.
Figure 7:
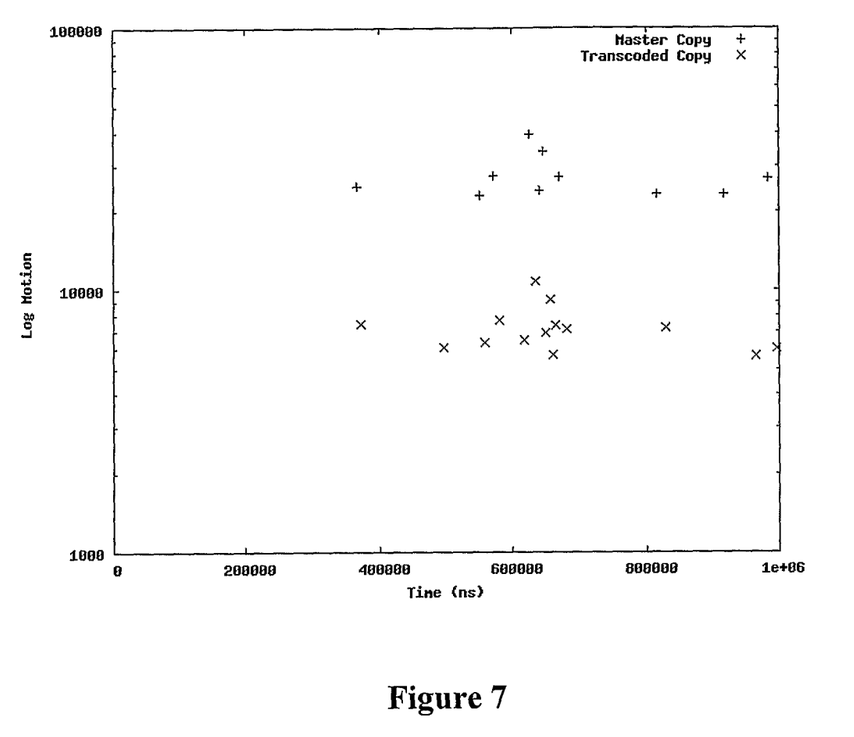
FIG. 7 is a sub-set of the peaks of the points of interest fingerprints for a master version of a video and a poor quality copy of that same video.
Figure 8:
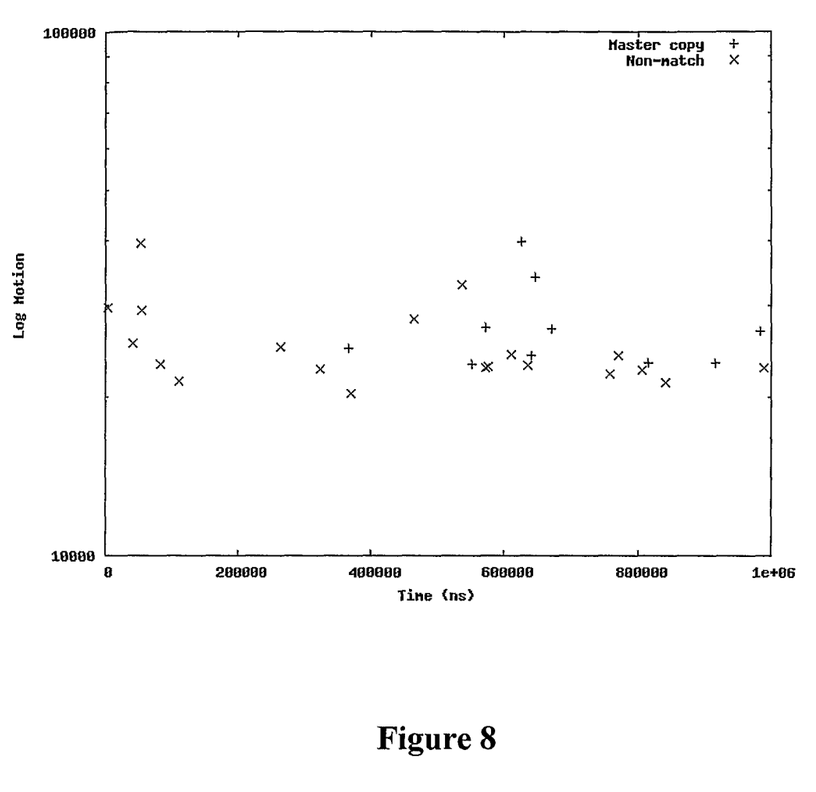
FIG. 8 is a sub-set of the peaks of the points of interest fingerprints for a master version of a video and a copy of a different non-matching video.

FIGS. 6 to 8 show data from various experiments conducted to demonstrate the effectiveness of the points of interest fingerprint in quickly and accurately identifying copies of a master version of a video.

FIG. 6 shows a reduced sized point of interest fingerprint for a master version of a video and an unknown copy. In each case, the first 1000000 nanoseconds of the video are shown. For this example, peaks of interest were selected from the points of interest fingerprints for both the master copy and the unknown copy, each of the selected peaks having a value above half of the maximum peak value. The filter process is then applied. This involves lining up as many as possible of the points of interest between the master and the copy under inspection. In this example, the "unknown" copy was in fact a high quality copy of the master. Hence, the points of interest should match up. This is confirmed by the results of FIG. 6, which show that the peaks of interest for the master version and the copy are completely coincident.

FIG. 7 shows the points of interest of the master version of a film, from 0 to 1000000 ns and the points of interest from a transcoded and so degraded copy of the same video. The graph is shown on the log scale so the detail can be more clearly seen. As before, the filter process works by lining up as many as possible of the points of interest between the master and the copy under inspection. In this case, there are three regions of interest, firstly at just under 400000 ns there is a point of interest on both the master and the copy. This is a fairly clear match even though the copy has a much lower peak height. The second region of interest is the cluster around 600000 ns. Here, a lower number of peaks of interest can be seen on the original when compared to the copy. This is due to noise introduced while transcoding the copy. The matching process must ignore some of the peaks of interest from the copy in order to perform the match. The third region of interest contains the final three peaks from both the original and the copy. There is no peak on the copy that matches the middle peak on the original. Hence, the process must ignore this middle peak and look for the best match for the next peak. As can be seen from FIG. 6, there is a reasonable degree of match between the two fingerprints, confirming that the transcoded video is a copy of the original, albeit a poor quality copy.

To illustrate what happens when a video is not a copy of a master version, consider FIG. 8, which shows data for the master version of the video used in the examples of FIGS. 6 and 7 and a video that is a non-match. The first area of interest is the area below 400000 ns. This shows eight points from the copy having no corresponding points on the master. The second area of interest is the area past 400000. There are enough points from the non-match due to the density of top-peaks chosen to provide a peak for each point for the master, based on just the x axis. However, taking into account the shape of the plots, using both the x and y components, it still does not match because there is not a reasonably stable offset that can be applied to the y axis in order to make the non-match points closely fit the master copy points. This illustrates that there is no match between the two fingerprints, confirming that the video under investigation is not a copy of the master version.

The present invention provides a simple, effective and speedy mechanism for potentially identifying unknown videos by using reduced sized fingerprints for a plurality of known videos and storing these for later comparison with reduced size fingerprints for unknown videos. The fingerprint filter and matching techniques of the invention can be carried out using any suitable hardware or software. Typically, the techniques are carried out in a computer implemented or based system. The computer system may be localised or distributed. Capture and processing of the video may be done in a single location. Alternatively, the video may be captured in one location and transmitted to another for motion finger printing.

A skilled person will appreciate that variations of the disclosed arrangements are possible without departing from the invention. For example, although a specific technique for detecting motion is described, it will be appreciated that any other video motion detection process could be used. In addition, the method could be applied to an entire video or only part of a video. Furthermore, other processes could be used to filter the fingerprints for the matching process. These could include but are not limited to taking the shortest fingerprint of the fingerprints being compared and sliding it horizontally and/or vertically over the longer fingerprint looking for the most points that line up with the smallest difference between points in the first and second fingerprint. Accordingly the above description of the specific embodiment is made by way of example only and not for the purposes of limitation. It will be clear to the skilled person that minor modifications may be made without significant changes to the operation described.

The invention claimed is:

1. A method for fingerprinting video comprising:
   identifying motion in a video as a function of time;
   using the motion to create a motion fingerprint;
   identifying, using a computer device processor, one or more points of interest in the motion fingerprint; and
   using one or more of the points of interest in the motion fingerprint to create a points of interest fingerprint.

2. A method as claimed in claim 1 wherein the one or more distinguishing features or points of interest comprise peaks and/or troughs in the motion data.

3. A method as claimed in claim 1 comprising filtering the points of interest fingerprint to reduce its size.

4. A method as claimed in claim 1 wherein the identifying motion in a video as a function of time further comprises: comparing a measure of luminance of pixels of a first frame of the video with a corresponding measure of luminance of pixels of a second frame of the video; identifying differences between the luminance for like pixels of the first and second frames; and using the differences to determine a measure of motion between the first and second frames, and repeating the identifying motion in a video as a function of time for a plurality of frame pairs.

5. A method as claimed in claim 1 wherein the identifying motion in a video as a function of time further comprises: comparing a measure of luminance of blocks of pixels of a first frame of the video with a corresponding measure of luminance of corresponding blocks of pixels of a second frame of the video; identifying differences between the luminance for like blocks of the first and second frames; and using the differences to determine a measure of motion between the first and second frames, and repeating the identifying motion in a video as a function of time for a plurality of frame pairs.

6. A computer program product comprising a non-transitory computer readable storage medium having computer readable program code portions stored therein, the computer readable program code portions comprising:
   a first program code portion configured to identify motion in a video as a function of time;
   a second program code portion configured to use the motion to create a motion fingerprint;
   a third program code portion configured to identify, using a computer device processor, one or more points of interest in the motion fingerprint; and
   a fourth program code portion configured to use the one or more points of interest to create a points-of-interest fingerprint.

7. A computer based or implemented system comprising:
   a first portion configured to identify motion in a video as a function of time;
   a second portion configured to use the motion to create a motion fingerprint;
   a third portion configured to identify one or more points of interest in the motion fingerprint; and
   a fourth portion configured to use the one or more points of interest to create a points-of-interest motion fingerprint.

8. A method for identifying video, the method comprising:
   identifying motion in a video as a function of time
   using the motion to create a motion fingerprint;
   identifying, using a computer device processor, one or more points of interest in the motion fingerprint;
   using one or more of the points of interest in the motion fingerprint to create a points-of-interest fingerprint; and
   using a points-of-interest motion fingerprint for an unknown video and the points-of-interest motion fingerprint for a known video to identify a potential match between the unknown video and the known video.

9. A method as claimed in claim 8 wherein a sub-set of peaks within the points-of-interest motion fingerprint for the known video and a sub-set of peaks within the points-of-interest motion fingerprint for the unknown video are selected and used to identify a potential match between the unknown video and the known video.

10. A method as claimed in claim 9 wherein the sub-set of peaks is selected by identifying, using a computer device processor, a highest peak within a predetermined or selected time slot.

11. A method as claimed in claim 10 comprising identifying a highest peak for a plurality of time slots.

12. A method as claimed in claim 11 wherein the plurality of time slots are of equal length.

13. A method as claimed in claim 8 comprising comparing, using a computer device processor, peak pairs in the points of interest motion fingerprint for the known video and peak pairs in the points-of-interest motion fingerprint for the unknown video.

14. A method as claimed in claim 13 comprising comparing the separation between peak pairs.

15. A method as claimed in claim 13 wherein a peak pair comprises adjacent peaks.

16. A method as claimed in claim 13 wherein a peak pair comprises non-adjacent peaks.

17. A method as claimed in claim 8 further comprising comparing the points-of-interest motion fingerprint for the unknown video with points-of-interest motion fingerprints for a plurality of known videos.

18. A method as claimed in claim 8 further comprising:
   identifying motion in the unknown video or known video as a function of time; using the motion to create a motion fingerprint;
   identifying, using a computer device processor, one or more distinguishing features or points of interest in the motion fingerprint; and
   using the one or more distinguishing features or points of interest to create the points-of-interest motion fingerprint for the unknown video or the known video.

19. A method as claimed in claim 18 wherein the one or more distinguishing features or points of interest are peaks or troughs in the motion data.

20. A computer program product comprising a non-transitory computer readable storage medium having computer readable program code portions stored therein, the computer readable program code portions comprising:
   a first program code portion configured to identify motion in a video as a function of time
     a second program code portion configured to use the motion to create a motion fingerprint;
     a third program code portion configured to identify, using a computer device processor, one or more points of interest in the motion fingerprint;
     a fourth program code portion configured to use one or more of the points of interest in the motion fingerprint to create a points-of-interest fingerprint; and
     a fifth program code portion configured to identify video by using a points-of-interest motion fingerprint for an unknown video and the points-of-interest motion fingerprint for a known video to identify a potential match between the unknown video and the known video.

21. A computer program product as claimed in claim 20 wherein the fifth program code portion is configured to identify a potential match between the unknown video and the known video by identifying a sub-set of peaks within the points-of-interest motion fingerprint for the known video and a sub-set of peaks within the points-of-interest motion fingerprint for the unknown video.

22. A computer program product as claimed in claim 21 further comprising a sixth program code portion configured to select, using a computer device processor, a sub-set of peaks by identifying a highest peak within a pre-determined or selected time slot.

23. A computer program product as claimed in claim 22 further comprising a seventh program code portion configured to identify a highest peak for a plurality of time slots.

24. A computer program product as claimed in claim 23 wherein the plurality of time slots are of equal length.

25. A computer program product as claimed in claim 20 further comprising a sixth program code portion configured to compare, using a computer device processor, peak pairs in the points of interest motion fingerprint for the known video and peak pairs in the points-of-interest motion fingerprint for the unknown video.

26. A computer program product as claimed in claim 25 further comprising a seventh program code portion configured to compare the separation between peak pairs.

27. A computer program product as claimed in claim 25 wherein a peak pair comprises adjacent peaks.

28. A computer program product as claimed in claim 25 wherein a peak pair comprises non-adjacent peaks.

29. A computer program product as claimed in claim 20 further comprising a second program code portion configured to compare the points-of-interest motion fingerprint for the unknown video with points-of-interest motion fingerprints for a plurality of known videos.

30. A computer program product as claimed in claim 20 further comprising:
a sixth program code portion configured to identify motion in the unknown video or known video as a function of time;
a seventh program code portion configured to use the motion to create a motion fingerprint;
an eighth program code portion configured to identify one or more distinguishing features or points of interest in the motion fingerprint; and
a ninth program code portion configured to use the one or more distinguishing features or points of interest to create the points of interest fingerprint for the unknown video or the known video.

31. A computer program product as claimed in claim 30 wherein the one or more distinguishing features or points of interest are peaks and/or troughs in the motion data.

32. A method for identifying potential matches between one or more videos comprising:
Comparing, using a computer device processor, selected points on a motion fingerprint for a first video with selected points on motion fingerprints for a plurality of other videos; and
removing fingerprints for any of the plurality of other videos that do not match the first video based on the comparison of the selected points.

33. A method as claimed in claim 32 comprising comparing the motion fingerprint for the first video with the motion fingerprint for the remaining video(s).

* * * * *